(12) United States Patent
Li et al.

(10) Patent No.: US 12,237,562 B2
(45) Date of Patent: Feb. 25, 2025

(54) 5G INTEGRATED SMART LED LIGHTING SYSTEM

(71) Applicant: TELEFONAKTIEBOLAGET LM ERICSSON (PUBL), Stockholm (SE)

(72) Inventors: Xiaochuan Li, Ottawa (CA); Roland Smith, Nepean (CA); Shuang Zhao, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 282 days.

(21) Appl. No.: 17/619,483

(22) PCT Filed: Jun. 19, 2020

(86) PCT No.: PCT/IB2020/055809
§ 371 (c)(1),
(2) Date: Dec. 15, 2021

(87) PCT Pub. No.: WO2020/255081
PCT Pub. Date: Dec. 24, 2020

(65) Prior Publication Data
US 2022/0320707 A1    Oct. 6, 2022

(51) Int. Cl.
*H01Q 1/06* (2006.01)
*F21V 33/00* (2006.01)
*H04B 1/38* (2015.01)
*H05B 47/115* (2020.01)
*F21Y 115/10* (2016.01)

(52) U.S. Cl.
CPC ........... *H01Q 1/06* (2013.01); *F21V 33/0052* (2013.01); *H04B 1/38* (2013.01); *H05B 47/115* (2020.01); *F21Y 2115/10* (2016.08)

(58) Field of Classification Search
CPC ........ H01Q 1/06; F21V 33/0052; H04B 1/38; H05B 47/115; F21Y 2115/10
See application file for complete search history.

(56) References Cited

U.S. PATENT DOCUMENTS

| | | | |
|---|---|---|---|
| 8,558,413 B1 | 10/2013 | Lepard | |
| 9,049,753 B1 * | 6/2015 | Wassel | H05B 45/14 |
| 9,955,551 B2 * | 4/2018 | Spero | F21K 9/23 |
| 9,997,070 B1 * | 6/2018 | Komanduri | H05B 47/195 |
| 10,344,927 B1 * | 7/2019 | Wright | G08B 13/19 |
| 2015/0035440 A1 * | 2/2015 | Spero | F21S 41/147 |
| | | | 315/153 |
| 2016/0205362 A1 | 7/2016 | Tang et al. | |
| 2017/0042003 A1 * | 2/2017 | Logvinov | H05B 47/19 |
| 2017/0231053 A1 * | 8/2017 | Underwood | F21S 9/028 |
| 2019/0008017 A1 * | 1/2019 | Modi | H05B 47/115 |
| 2021/0162912 A1 * | 6/2021 | Spero | H05B 45/395 |

FOREIGN PATENT DOCUMENTS

GB    2560706 A    9/2018

OTHER PUBLICATIONS

Bohnhoff, Peter, International Search Report, PCT/IB2020/055809, EPO, The Netherlands, Nov. 13, 2020.

* cited by examiner

*Primary Examiner* — David E Lotter
(74) *Attorney, Agent, or Firm* — Sonoda & Kobayashi Intellectual Property Law; Sarvajit S. Patil

(57) ABSTRACT

An integrated Smart LED Light/3GPP radio fixture, comprising: a Smart LED light fixture; and a 3GPP radio unit configured to transmit and receive radio signals within a coverage area that corresponds with an illumination coverage area of the Smart LED light fixture.

20 Claims, 13 Drawing Sheets

- TRP transmits SS blocks in (wide) SS block zones
  - zone sweeping is used
- UE finds a suitable TRP SS block zone
  - Any SS above a threshold
  - Suitable RX zone as well
- The UE transmits PRACH preamble in a PRACH resource associated with the SS zone
  - PRACH transmission time indicated in system information
- TRP sweeps its RX zone to receive PRACH transmissions

5G INTEGRATED SMART LED LIGHTING SYSTEM

This application is a 35 U.S.C. § 371 national phase filing of International Application No. PCT/IB2020/055809, filed Jun. 19, 2020, the content of which is incorporated herein by reference in its entirety.

TECHNICAL FIELD

The present disclosure relates to a combined radio transceiver and Smart LED lighting system.

BACKGROUND

Indoor radio coverage has traditionally been achieved through outdoor radio base station coverage penetration of buildings as the lowest cost solution. Service providers will install outdoor micro or macro radio base stations with their antennas directed at buildings to provide indoor coverage.

Larger venues such as shopping malls, train stations, stadiums, and colleges cannot be adequately covered using outdoor radio base stations and use distributed antenna systems (DAS) for indoor coverage. DAS products carry radio base station signals throughout a building to remoted active antennas. DAS are expensive "add-on" solutions requiring two complete radio infrastructures—a centralized RBS, and the DAS. DAS products are nearing an evolutionary end, as they are unable to carry 4G Massive MIMO Advanced Antenna Systems (AAS) signals, or 5G mmW and NR ultra-low latency signals.

Pico and Femto radio base stations have been used in limited indoor deployments but were rejected by service providers who required feature parity with the cellular network and a 5G evolution plan.

In recent years, Ericsson has introduced the Radio Dot System (RDS)—a specialized product for indoor deployments. The RDS leverages Ericsson's macro-cellular base software and supports 4G 8×8 Massive MIMO as well as 5G/NR including mmW bands. The RDS has seen great success and continues to lead the market for new indoor 3GPP coverage applications, as Service Providers transition from DAS to RDS.

The RDS enables Service Providers to offer their customers a high-performance indoor network which is feature compatible to the outdoor network. Smart phone users experience a ubiquitous network, with seamless indoor-to-outdoor handovers and functionality. Service Providers use their network management system to manage both outdoor and indoor deployments. Landlords often receive glowing feedback from their customers regarding the RDS performance.

However, all conventional indoor radio solutions require installers to install active radio heads in ceilings—a process which often requires cutting holes in ceiling panels or drywall. Landlords request restoration plans costs before installation can start, and often present concerns over the number and locations of holes. These Installations are invasive, since radio transceivers such as "dots" for an RDS, or active antennas for a DAS, require cutting many ceiling holes. Some solutions repurpose TV/Cable wall outlets for radio applications, but these solutions are poorly located for radio deployments, and not well used.

Accordingly, there remains a need for a cost-effective solution for deploying indoor radio coverage that overcomes at least some of the above-noted limitations of the prior art.

SUMMARY

Aspects of the present invention provide an integrated Smart LED Light/3GPP radio fixture, comprising: a Smart LED light fixture; and a 3GPP radio unit configured to transmit and receive radio signals within a coverage area that corresponds with an illumination coverage area of the Smart LED light fixture.

The proposed solution describes PoE powered Smart LED lighting fixture for dual use with 3GPP radios.

BRIEF DESCRIPTION OF THE DRAWINGS

The accompanying drawing figures incorporated in and forming a part of this specification illustrate several aspects of the disclosure, and together with the description serve to explain principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

At least some of the following abbreviations and terms may be used in this disclosure.

3GPP 3$^{rd}$ Generation Partnership Project
4G Fourth Generation (LTE) Radio
5G Fifth Generation (NR) Radio
AAS Advanced Antenna System
BF Beamforming
BI Beam Index
DL Downlink
DU Digital Unit
eNB Enhanced Node B
KPI Key Performance Index
LTE Long Term Evolution (4th Generation Cellular)
LTE Long Term Evolution
mmW millimeter wave
NR Next Generation Radio
PoE Power over Ethernet
RSRP Reference Signal Received Power
TDD Time Division Duplexing
UE User Equipment, such as a cell phone
UL Uplink References in this disclosure to various technical standards (such as 3GPP TS 38.211 V15.1.0 (2018-03) and 3GPP TS 38.214 V15.1.0 (2018-03), for example) should be understood to refer to the specific version(s) of such standard(s) that is(were) current at the time the present application was filed, and may also refer to applicable counterparts and successors of such versions.

The description herein focuses on a 3GPP cellular communications system and, as such, 3GPP terminology or terminology similar to 3GPP terminology is oftentimes used. However, the concepts disclosed herein are not limited to a 3GPP system.

Figure 1:
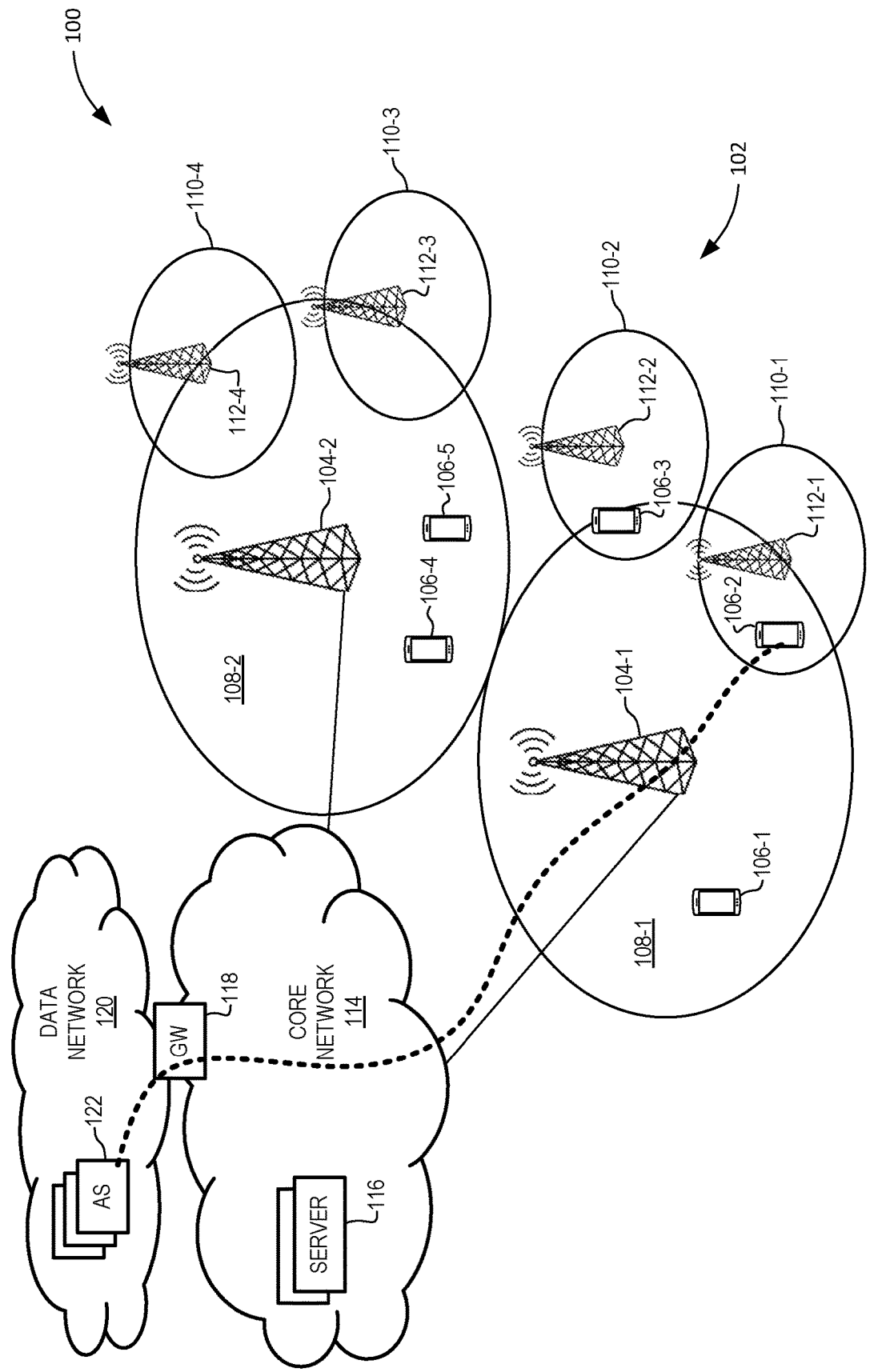
FIG. 1 is a block diagram schematically illustrating a representative network in which embodiments of the present invention may be deployed.

FIG. 1 illustrates one example of a cellular communications network 100 in which embodiments of the present disclosure may be implemented. In the embodiments described herein, the cellular communications network 100 is a Public Land Mobility Network (PLMN) conforming to one or more of the LTE, 3G, 4G and 5G NR standards, or their successors. In the illustrated example, the cellular communications network 100 includes a (Radio) Access Network ((R)AN) 102 comprising base stations 104-1 and 104-2 controlling radio communications with wireless devices 106-1, 106-2, 106-3, 106-4, 106-5 within corresponding macro cells 108-1 and 108-2. Each macro cell 108 may be defined by any suitable combination of geography, frequency, Radio Access Technology (RAT) and modulation scheme.

Base stations 104 can be any type of network access device capable of establishing radio connection(s) with one or more wireless devices 106 within a respective coverage area of the base station 104 or low power node 112, and further configured to forward subscriber traffic between the core network 114 and the one or more wireless devices 106. An important feature of a base station 104 is that it is configured with both a radio interface configured to send and receive radio signals to and from a wireless device 106, and a network interface configured to exchange electronic and/or optical signals with the core network 114. Examples of base stations 104 and low power nodes 112 include: Evolved Node B (eNB) systems (known, for example, in the 3GPP standards): WiFi access points (known, for example from IEEE 802.11 standards) or the like. In some contexts, a base station 104 may be referred to as an access point (AP) regardless of the Radio Access Technology (RAT) that it supports.

The illustrated (R)AN 102 also includes small cells 110-1 through 110-4, within which radio communication can be controlled by corresponding low power nodes 112-1 through 112-4. As with the macro cells 108, each small cell may be defined by any suitable combination of geography, frequency, Radio Access Technology (RAT) and modulation scheme. As with the base stations 104, a low power node 112 can be any type of network access device capable of establishing radio connection(s) with one or more wireless devices 106 within a respective coverage area of the low power node 112, and further configured to forward subscriber traffic between the core network 114 and the one or more wireless devices 106. An important feature of a low power node 112 is that it is configured with both a radio interface configured to send and receive radio signals to and from a wireless device 106, and a network interface configured to exchange electronic and/or optical signals with the core network 114. In some embodiments, a low power node 112 may be connected to the core network 114 by a direct connection, such as an optical cable. In other embodiments, a low power node 112 may be connected to the core network 114 by an indirect connection, such as via a radio or optical fiber link to a base station 104. Examples of low power nodes 112 include: Remote Radio Heads (RRHs) connected to a base station or a network router (not shown): WiFi access points or the like. In some contexts, a low power node 112 may be referred to as an access point (AP) regardless of the specific Radio Access Technology (RAT) that it supports.

Notably, while not illustrated, a particular small cell 110 may alternatively be controlled by a base station 104, for example using a beam-forming technique. In such cases, the particular small cell 110 will not be associated with a respective low power node 112 per se. Rather, the particular small cell 110 will be associated with a respective set of parameters implemented in the base station 104. In this disclosure, the term "cell" is used to refer to a defined combination of parameters (such as geography, frequency, Radio Access Technology (RAT), modulation scheme, identifiers and the like) that can be used by a wireless device 106 to access communication services of the network 100. The term "cell" does not imply any particular parameter values, or any particular physical configuration of devices needed to enable a wireless device 106 to access those communication services.

Wireless devices 106 can be any type of device capable of sending and receiving radio signals to and from a base station 104 and/or low power node 112. Examples of wireless device 106 include cellular phones, Personal Data Assistants (PDAs), mobile computers, Internet of Things (IoT) devices, autonomous vehicle controllers, and the like. In some contexts, a wireless device 106 may be referred to as a User Equipment (UE) or a mobile device.

In some embodiments, the macro cells 108-1 and 108-2 may overlap each other, and may also overlap one or more small cells 110. For example, a particular macro cell 108-1 may be one macro cell 108 among a plurality of macro cells covering a common geographical region and having a common RAT and modulation scheme, but using respective different frequencies and/or AP identifiers. In such cases, a wireless device 106 located within a region covered by two or more overlapping cells 108, 112 may send and receive radio signals to and from each of the corresponding base stations 104 and/or low power nodes 112.

In the illustrated example, the (R)AN 102 is connected to a Core Network (CN) 114, which may also be referred to as Evolved Core Network (ECN) or Evolved Packet Core (EPC). The CN 114 includes (or, equivalently, is connected to) one or more servers 116 configured to provide networking services such as, for example, Network Functions (NFs) described in 3GPP TS 23.501 V15.2.0 (2018-06) "System Architecture for the 5G System" and its successors. The CN 114 also includes one or more gateway (GW) nodes 118 configured to connect the CN 114 to a packet data network (DN) 120 such as, for example, the internet. A gateway node 118 may be referred to as a packet gateway (PGW) and/or a serving gateway (SGW). The DN 120 may provide communications services to support end-to-end communications between wireless devices 106 and one or more application servers (ASs) 122 configured to exchange data packet flows with the wireless devices 106 via the CN 114 and (R)AN 102. In some contexts, an application server (AS) 122 may also be referred to as a host server.

In some contexts, an end-to-end signal path between an AS 122 and one or more wireless devices 106 may be referred to as an Over-The-Top (OTT) connection. Similarly, a communication service that employs signal transmission between an AS 122 and one or more wireless devices 106 may be referred to as an OTT service.

It should be appreciated that the separation between the CN 114 and the DN 120 can be purely logical, in order to simplify understanding of their respective roles. In particular, the CN 114 is primarily focused on providing wireless device access services and supporting wireless device mobility. On the other hand, the DN 120 is primarily focused on providing end-to-end communications, particularly across network domains. However, it will be appreciated that both the CN 114 and the DN 120 can be implemented on common physical network infrastructure, if desired.

Figure 2A:
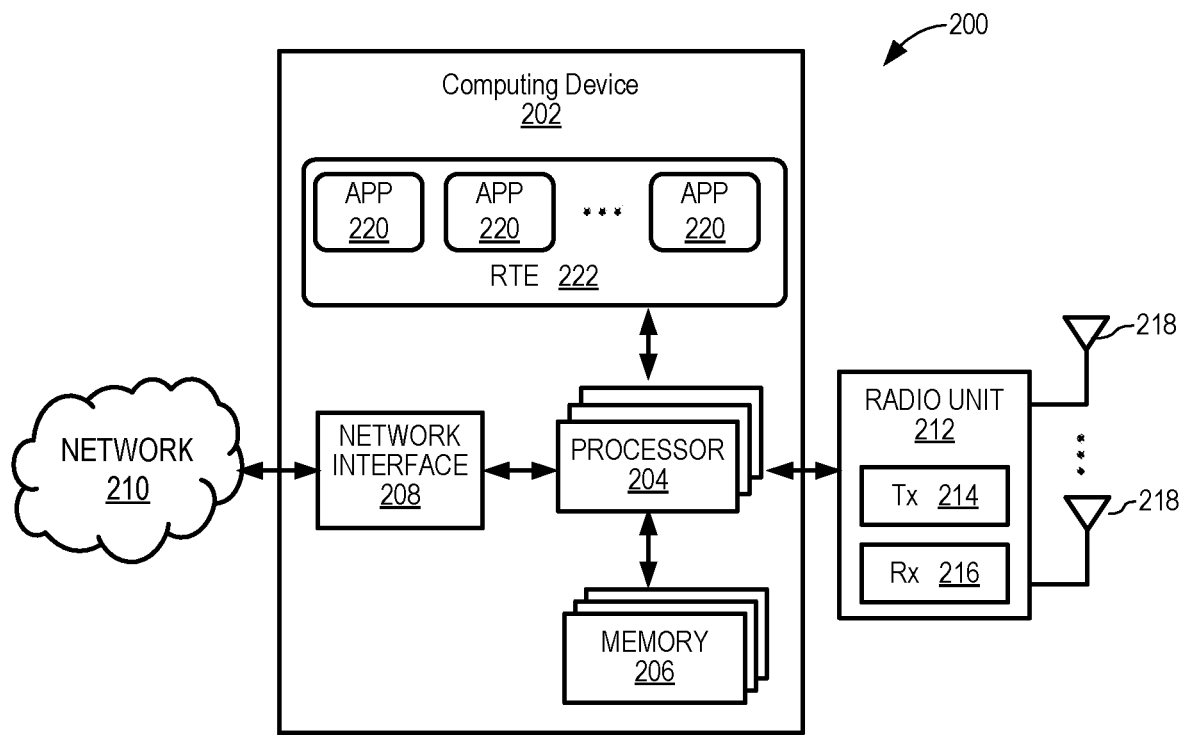
FIGS. 2A and 2B are block diagrams schematically illustrating examples of a computing device usable in embodiments of the present invention.
Figure 2B:
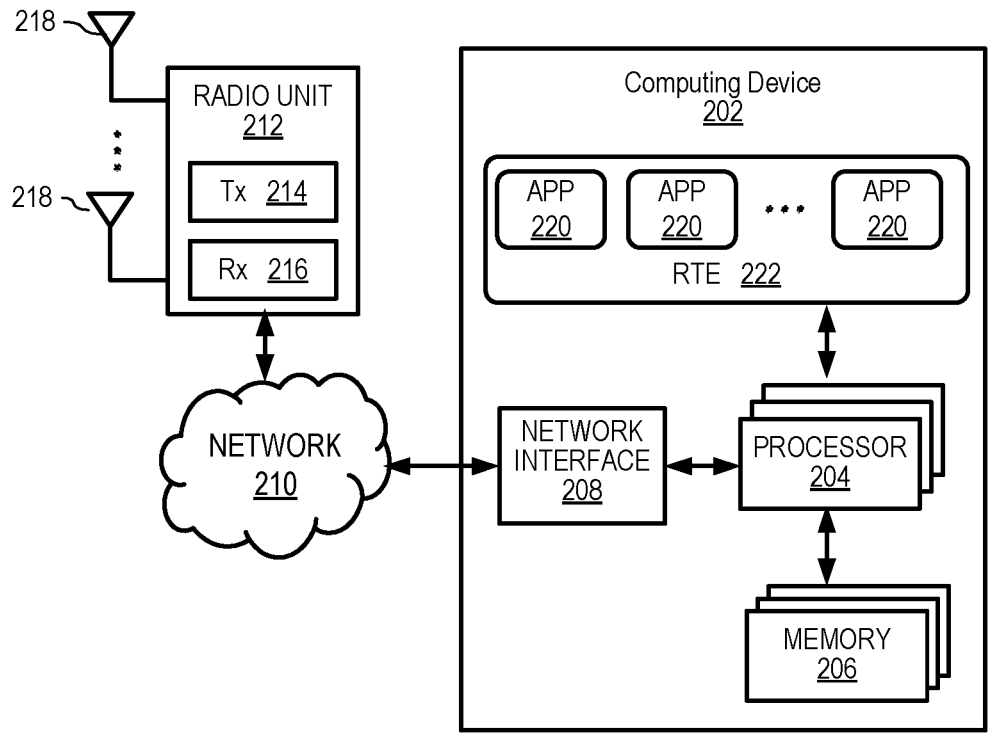

FIGS. 2A and 2B are block diagrams schematically illustrating a communications system 200 including a computing device 202 usable in embodiments of the present invention. In various embodiments, any or all of the base stations 104 or 112, wireless devices 106, core network servers 116 or gateways 118 and data network servers 122 may be implemented using systems and principles in accordance with the computing device 202. It may also be appreciated that any or all of the elements of the network 100 may be virtualized using techniques known in the art or developed in the future, in which case the functions of any or all the base stations 104 or 112, core network servers 116 or gateways 118, and/or any or all network functions may be implemented by suitable software executing within a computing device 202 or within a data center (not shown) composed of multiple computing devices 202.

In the example of FIG. 2A, the communications system 200 generally includes computing device 202 connected to one or more networks 210 and one or more radio units 212. The computing device 202 includes one or more processors 204, a memory 206, one or more network interfaces 208. The processors 204 may be provided as circuitry configured as any suitable combination of Central Processing Units (CPUs), Application Specific Integrated Circuits (ASICs), Field Programmable Gate Arrays (FPGAs), or the like. Similarly, the memory 206 may be provided as any suitable combination of Random Access Memory (RAM), Read Only Memory (ROM) and mass storage technologies such as magnetic or optical disc storage or the like. The network interfaces 208 enable signaling between the computing device 200 and the networks 210, such as the Core Network 114, the data network 120, or a private domain network such as a data center (not shown).

Each radio unit 212 typically includes at least one transmitter (Tx) 214 and at least one receiver (Rx) 216 coupled to one or more antennas 218. In the example of FIG. 2A, the radio unit(s) 212 is(are) shown as being external to the computing device 202 and connected to the computing device 2302 via a suitable physical interface (such as a copper cable or an optical cable). In the example of FIG. 2B, the radio unit(s) 212 is(are) shown as being connected to computing device 202 via a network 210 and a network interface 208. In still other embodiments, the radio unit(s) 212 and optionally also the antenna(s) 218 may be integrated together with the computing device 202.

The one or more processors 204 operate to provide functions of the computing device 202. Typically, these function(s) are implemented as software applications (APPs) 220 or modules that are stored in the memory 206, for example, and executed by the one or more processors 204. In some embodiments, one or more software applications or modules 220 may execute within a secure run-time environment (RTE) 222 maintained by an operating system (not shown) of the computing device 202.

It may be appreciated that specific embodiments may exclude one or more of the elements illustrated in FIGS. 2A and 2B. For example, a computing device 202 configured to implement a wireless device 106 may incorporate one or more processors 204, a memory 206, and one or more radio units 2312, but may exclude a network interface 208. Conversely, a computing device 202 configured to implement a server 116 or 122 may include one or more processors 204, a memory 206, and one or more network interfaces 2308, but may exclude radio units 212. A computing device 202 configured to implement a base station 104 or 112, on the other hand, will normally include one or more processors 2304, a memory 206, and both radio units 212 and network interfaces 208.

Figure 3:
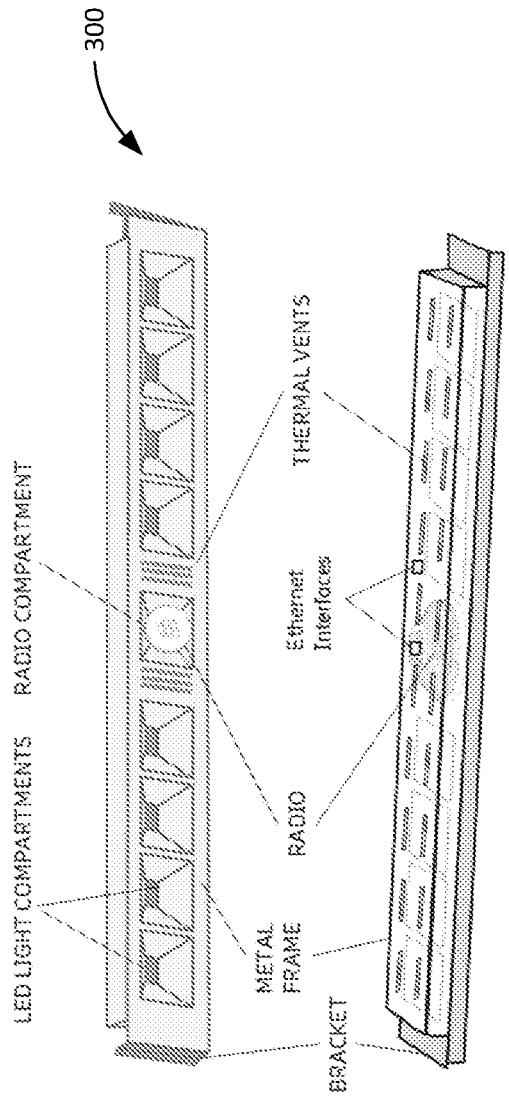
FIG. 3 illustrates elements of an integrated LED light/3GPP radio fixture in accordance with a representative embodiment of the present invention.

Systems and methods are disclosed herein that provide a PoE powered Smart LED light fixture integrated with a 3GPP 4G/5G radio. FIG. 3 illustrates an example integrated LED light/3GPP radio fixture 300 in accordance with embodiments of the present invention. As may be appreciated, the integrated LED light/3GPP radio fixture 300 may have any suitable form factor, such as 4"×48" and 24"×48" lighting fixtures commonly used in office environments, for example. FIG. 3 illustrates an example integrated LED light/3GPP radio fixture 300 configured as a 4"×48" lighting fixture, including eight LED light compartments (each of which may include an LED emitter and a reflector) and a radio compartment including a 3GPP radio unit. Both of the PoE lighting unit and the radio unit may include respective power and control circuitry, any or all of which may be configured as a computing device of the type described above with reference to FIGS. 2A and 2B.

Smart LED lighting fixtures do not operate from standard AC voltages, such as 110/220 Vac or 3-phase 277/347 Vac common in enterprise deployments. Rather, smart lighting fixtures use LED technology with Power-over-Ethernet (PoE) power. They are considered smart because of their programmable operations and efficiency enabling dynamic configuration using Ethernet communications. Smart LED lights can be remotely programmed by a Smart LED Network Controller to meet OSHA lighting specifications and provide lighting controls help building managers conserve energy in many ways, such as enabling automatic light level adjustments to changing daylight conditions and occupancy patterns.

Embodiments of the present invention integrate 3GPP 4G/5G Radio technology into a Smart PoE LED Light fixture while achieving a unique alignment of 3GPP 4G/5G radios to Smart LED lighting attributes.

Embodiments of the present invention may enhance the business investment value of smart lighting solutions beyond the significant savings in energy usage and general improvements in working environment comfort to include a power optimized Smart 3GPP 4G/5G integrated radio.

Embodiments of the present invention may be deployed at a much higher density than traditional 3GPP 4G/5G radios resulting in a significant improvement in power efficiency. Traditional 4G/5G indoor deployments utilize 20-30 dBm transceivers deployed at 20-30 m interspatial distances. On the other hand, office LED lights are often deployed at 50× to 100× greater density, using a grid of 2.5-3.5 m or every 10-12 feet. As a result, by integrating a radio unit in each smart LED light fixture embodiments of the present invention solution can be implemented using ultra low transmit power, (e.g. of 0 dBm to +10 dBm).

Embodiments of the present invention, in aligning 3GPP 4G/5G radios characteristics to Smart LED lighting attributes, may introduce a modified class of 3GPP 4G/5G complaint radios.

Embodiments of the present invention may adapt the 3GPP 4G5G NR beamforming concepts of radial beam indexes into the layered cartesian spatial coverage provided by Smart LED lighting solutions, including addressing challenges of downlink and uplink interference, beam addressability, and Ethernet bandwidth.

Embodiments of the present invention may dynamically align Smart LED Lights lighting zones with 3GPP 4G/5G radios for a power and capacity optimization of the working environment. The proposed solution aligns the 3GPP 4G/5G beams with the light distribution patterns and downlighting of Smart LED lights.

Embodiments of the present invention may align Occupational Safety and Health Administration (OSHA) lighting regulations for minimal lighting with E911 3GPP 4G/5G safety regulations.

Embodiments of the present invention may enable the effective integration of Smart LED lighting solutions with 3GPP 4G/5G radios.

Embodiments of the present invention may have any one or more of the following features/advantages:
  Deployment is simplified, by intelligently integrating radio operation with Smart LED light fixtures
  radio and Smart LED units are integrated into a single unit, with separate or combined PoE interface.
  Installers may install the Smart LED lighting fixtures into existing florescent light fixtures, routing the PoE cable for communications and power to the Smart LED light fixture, and at the same time install the 3GPP 4G/5G radio with no additional work, due to the 3GPP 4G/5G radio being an integral part of the Smart LED light fixture.
  Embodiments of the present invention align with International Energy Conservation Code (IECC) regulations for commercial Building Energy Standards
  Embodiments of the present invention may have low RF power, typically <10 dBm/branch, which helps to meet the IECC specification of 0.90 W/ft2 or 86.4 W/96 ft2 (8'×12') including Smart LED power. Consequently, embodiments of the present invention may meet commercial building energy standards including the radio 3GPP 4G/5G elements, and may be approved for use by builders,
  Embodiments of the present invention may align the illumination coverage of the Smart LED light with the RF coverage of the low powered 3GPP 4G/5G radios, such that the coverage area of each 3GPP 4G/5G radio corresponds with an illumination coverage area of the Smart LED light fixture. This alignment maps lighting attributes, such as spatial coverage, and spatial lighting zones onto RF parameters, such as combined cells and cell grouping both of which describe RF coverage zones. Combined Cells describes one or more antennas sectors configured with common PCI, whereas cell grouping describes the splitting of antenna sectors into unique PCI's. Consequently, this solution works as an integral solution with Smart LED lighting products,
  Embodiments of the present invention may meet 5G/NR latency requirements by modifying 3GPP 4G5G NR radial UL/DL beamforming indexes and scheduling operation to align with the cartesian spatial coverage of Smart LED lighting units, addressing DL/UP interference, beam addressability, and Ethernet bandwidth.
  Embodiments of the present invention may operate as an AAS 5G beamforming product, remapping radial beams onto spatially distributed cartesian zones, enabling 100% software reuse.
  Embodiments of the present invention may minimize UL interference by mapping combined cells onto coverage areas, and cell grouping onto spatial light zones. This proposed solution maps directly onto Ericsson's 3GPP 4G/5G RBS SW,
  Embodiments of the present invention may meet applicable OSHA and FCC safety requirements Embodiments of the present invention integrate a 3GPP 4G/5G radio with a Smart LED light fixture, sharing both PoE power and Ethernet data connectivity. FIG. 3 shows an example embodiment in which a PoE LED light fixture of a type manufactured by Phillips Corporation is integrated with a 3GPP 4G/5G radio unit of a type manufactured by Ericsson. In the illustrated example, separate PoE or Ethernet interfaces are provided, although a single interface for PoE or Ethernet may be used if desired.

Key aspects of the example illustrated in FIG. 3 include:
  Within the radio compartment, at least a portion of the metallic metal frame associated with the conventional light fixture is removed to expose the aperture of the 3GPP radio unit;
  An optional plastic cover may be provided over the radio compartment to hide the 3GPP radio unit,
  Thermal ventilation holes may be provided to enable air flow through the fixture,
  Optional metallic reflectors on the walls of the radio compartment may be provided to direct RF signals from the radio antenna(s) to the coverage area below the light fixture.
  Ethernet or Power Over Ethernet port accessibility at the top (backside) of the light fixture.

While FIG. 3 shows an example in which separate interfaces are provided for both Power over Ethernet to the Smart LED Fixture and the 3GPP radio, with no control path between these elements, alternative embodiments may combine these functions enabling alignment of key attributes of both Smart LED lighting and 3GPP radio solutions.

Figure 4:
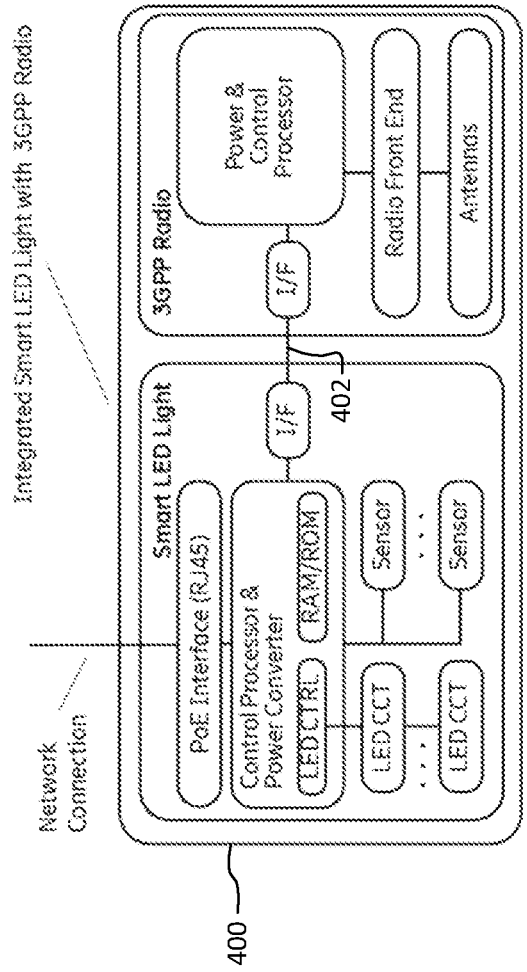
FIG. 4 is a block diagram illustrating elements of an example controller usable in embodiments of the present invention.

An example embodiment in which the PoE and Ethernet interfaces are integrated is shown in FIG. 4. This example integrates the 3GPP Radio element to the Smart LED light, and combines the PoE and Ethernet interfaces into a single network connection, and also provides a control link 402 between the Smart LED light and the 3GPP radio controllers. This link enables enhanced functions, such as product and status information from the Smart LED Light, including network control configuration and programming, Smart LED power and coverage, user proximity information, power saving operation status, available power, and Smart LED identification. This status and control information enables comprehensive 3GPP OA&M visibility of the 3GPP Radio solution.

Integration of the 3GPP Radio into a Smart LED light fixture may significantly change radio operation as compared to conventional solutions. For example, the 3GPP radio unit may be configured to transmit and receive radio signals within a coverage area that corresponds with an illumination coverage area of the Smart LED light fixture.

Indoor deployments normally install 3GPP radios at a density of about eight radio units per 5000 m², which is equivalent to 625 m² per radio (or a radius of 14 m). Customers typically deploy radios using an inter-spatial distance (ISD) ranging from 20 m to 30 m (radius=10 m-15 m), depending on interior walls. Indoor deployments require 3GPP radio power levels of 20 to 24 dBm per antenna branch to achieve acceptable SNIR levels.

Figure 5:
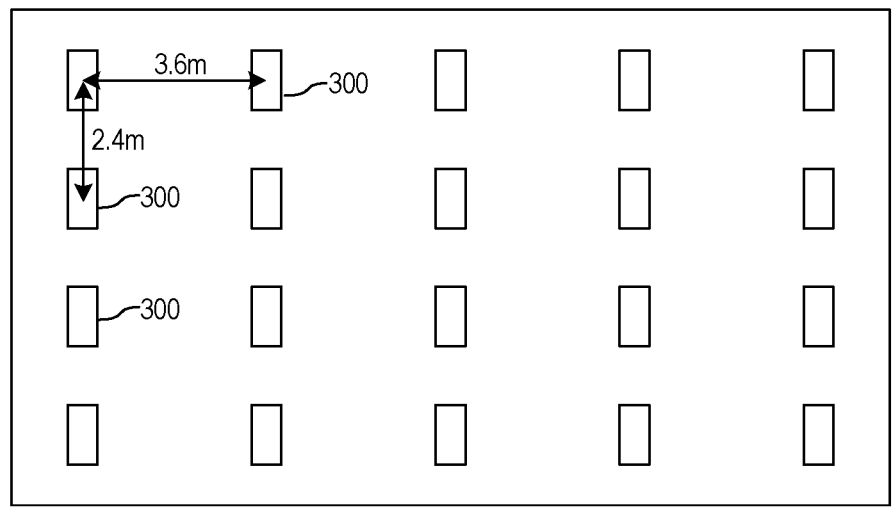
FIG. 5 illustrates an example layout of integrated LED light/3GPP radio fixtures in an office area.
Figure 6:
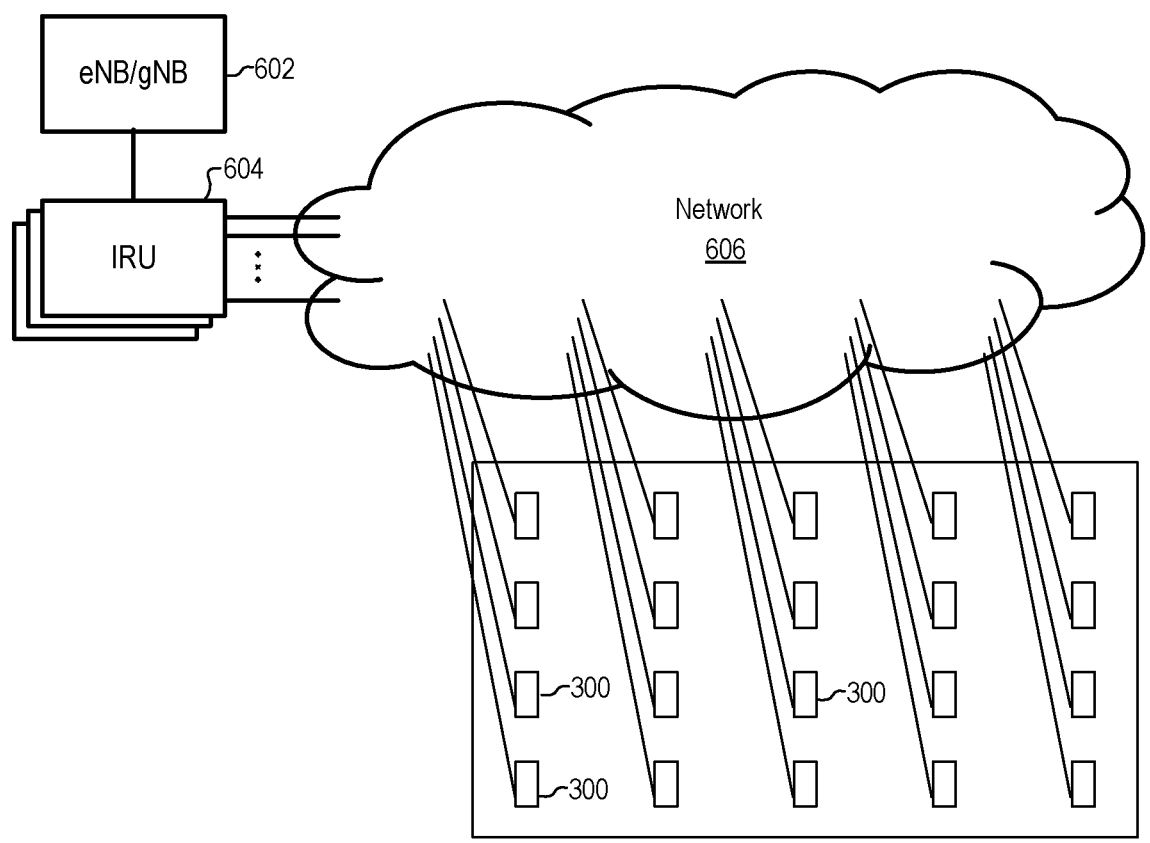
FIG. 6 is a block diagram illustrating an example network implemented using integrated LED light/3GPP radio fixtures arranged using the layout of FIG. 5.

Smart LED lights follow a tighter spacing, typically 8-12 feet or 2.4 m to 3.6 m as may be seen in FIG. 5. Referring to FIG. 6, such a grid of integrated PoE LED lighting/3GPP radio units 300 may be configured to operate as remote radio units (or Transmit Receive Points, TRPs) connected to a base station 602 via an PoE-capable ethernet network 606 and optionally one or more indoor radio units (IRUs) 604 of the type manufactured by Ericsson. An advantage of the IRU 604 is that it is capable of supporting multiple parallel physical connections to the network 606, each of which may support one or more packet flows between the base station 602 and integrated PoE LED lighting/3GPP radio units 300. The connection from IRU 604 may consist of one or more physical Ethernet ports, each of which contains one or more virtual connections, differentiated by IP address or VLAN tags. This virtual solution is advantageous in that it maps a small number of IRU physical ports onto a larger number of PoE LED Lighting/3GPP radio unit connections.

At the spacing determined by lighting requirements (described in greater detail below), each 3GPP Radio would need to have a coverage area of only 2.4 m×3.6 m or 8.6 m2, which is 72 times the density of traditional indoor radio deployments. Even with a grid spacing of 3 m×3.6 m=10.8 m2 (10 feet×12 feet), the radio density is still over 50× greater than traditional indoor radio deployments.

It is useful to consider the possible range of indoor Smart LED lighting fixture densities.

Occupational Health and Safety Administration (OSHA) regulations for "Levels of Lighting in Office Areas" specifies (in Section IV) in units of illumination, called lux, where 1 lux=1 lx=1 lumen/m². Schedule I (Section 6.4) specifies "desk work" lighting levels for difficult visual tasks are performed at 1000 lx. This level is reduced to 500 lx in areas where accounting, reading, or where visual tasks are performed. Conference rooms are required to have 300 lx of lighting.

Smart LED lights are compliant to IEEE 802.3 Power-over-Ethernet standards. IEEE 802.3af-2003 "PoE" Power sourcing Equipment (PSE) have a minimum capability of 15.4 W over two Ethernet pairs. In 2009, IEEE 802.3 at was released, introducing "PoE+" PSE with a minimum PSE capability of 30.0 W over two Ethernet pairs. This standard has further evolved to introduce "UPoE" 4-pair PSE capability of 60.0 W. As of this writing, IEEE 802.3 at allows PSE equipment to deliver 100 W of power over 4-pairs, if classified as a Limited Power Source according to IEC 60950 which limits power to 100 VA.

Smart LEDs are limited by delivered power. A 2017 US Department of Energy PoE Lighting System Energy Reporting Study analyzed 45,821 luminaries and found that 50% were 49 W or less, 71% were 71 W or less. The study showed most LED luminaries were limited to 100 W, with a mean of 49 W.

Smart LED efficiency is typically 130 lumens/watt, allowing illuminance and coverage to be calculated. Smart LED lights up to 7300 lumens can be provided in a conventional 24"×48" fixture. OSHA compliant coverage assuming 300 lx is then calculated using the maximum LED light output of 7300 lumens:

Illumination may be calculated as:

$$I = \frac{L_l C_u L_{LF}}{A_l}$$

where:
  $I$=illumination (lux,lumen/m²)
  $L_l$=lumens per lamp (lumen)
  $C_u$=coeffcieint of utilization
  $L_{LF}$=light loss factor
  $A_l$=area per lamp Rearranging for Coverage=$A_l$ and assuming typical values for $C_u$=0.6 and $L_{LF}$=0.8, we get:
  $A_l$=(7300)(0.6)(0.8)/(500)
  =7 square meters for an illumination of 500 lx, or
  =11.7 square meters for an illumination of 300 lx.

This clarifies the lighting coverage of Smart LED lights to provide OSHA lighting levels of 500 lx for an 2.4 m×3.6 m grid, and 300 lx for a 3 m×3.6 m grid.

Moreover, these levels of lighting align with International Energy Conservation Code (IECC) regulations for commercial Building Energy Standards which specify a maximum power utilization of 0.90 W/ft2 or 86.4 W/96 ft2 (2.4 m×3.6 m) including Smart LED power.

Commercially available PoE LED light fixtures, such as those sold by Phillips, for example, draw 57 W with an efficacy of 127 lumens/watt, while delivering 7239 lumens. Light fixtures of this type can accommodate 30 W of power available for a 3GPP radio, while remaining compliant to OSHA and IECC standards, thus ensuring that the integrated solution meets commercial building energy standards including the 3GPP 4G/5G Radio and may be approved for use by all builders.

Regardless of the Smart LED light grid layout, the array of lighting fixtures in a typical office environment has a density which is between 50× and 100× denser than typical Indoor 3GPP Radio installations. Although it may appear reasonable to address this increased density discrepancy by scaling down the 3GPP Radio transmit power to align with the higher density of Smart LED luminaries, this modification would not yield a working solution.

Embodiments of the present invention enable an integrated Smart LED light with 3GPP Radio solution, resolving critical design issues which would arise in such a product offering.

A 3GPP Radio 4G/5G RF signals propagate according to Friis formula for free space path loss:

$$FSPL = \left(\frac{4\pi d}{\lambda}\right)^2$$

where:

λ is the signal wavelength, d is the propagation distance,

λ and d are in the same unit of length, d>>λ to ensure distances are far field.

A 3GPP Radio operating in Band 40 (2300 MHz-2400 MHz) has a λ=c/f=3*108/2.4*109=0.125 m. The free space path loss at the edge of a 15 m radius (ISD=30 m) of:

FSPL(15 m)=(4πd/0.125)$^2$

FSPL(15 m)=2273956

FSPL(15 m)=10*log(2273956) dB

FSPL(15 m)=63.6 dB

Using the Smart LED light ISD of 2.4 m-3.6 m, assuming an average value of 3.0 m, the free space path loss at a 1.5 m radius is:

FSPL=43.6 dB

This may lead to a conclusion that it is sufficient to reduce the 3GPP 4G/5G Radio power 20 dB to align the cell edge power, resulting in a 3GPP Radio transmit power of 0 dBm to +10 dBm per branch. This reduction has a significant impact in coverage, affecting both DL and UL operation.

Most venues where indoor 3GPP solutions are deployed have average coverage areas of 50,000 m$^2$ to 100,000 m$^2$ employing 80-160 radio transmitters, deployed in groups of 8-16 per cell. Most indoor venues are then designed with 10-20 cells, with downlink transmissions configured for simulcasting, and uplink carriers configured for signal aggregation. These parameters fall within the definition of an eNodeB which supports up to 256 cells.

An integrated LED light/3GPP radio fixture must provide similar coverages up to 100,000 m$^2$. Such deployments would require at least 50× as many radio transmitters. If configured as cells consisting of 8-16 transceivers, these indoor venues would require 500-1000 cells, which is unsupported by 3GPP. Alternately, if each cell was designed with 50× as many radio transmitters, then the radio solution would have unacceptable uplink interference, and excessive downlink multipath delay spreads.

An indoor cell which aggregates 8-16 uplink signals increases interference by 9-12 dB. Aggregating 50× as many uplink signals may increase interference by as much as 26-29 dB. Such an interference necessitates an equivalent adjustment in UE transmitted power and would be unacceptable to 3GPP Service Providers who protect their spectrum by minimizing UE transmitted power. In short, a network which configures UEs to transmit with 26-29 dB increased power levels would adversely affect nearby cells as 3GPP 4G/5G cells are typically deployed with an N=1 channel reuse plan.

Fronthaul bandwidth is a second major issue which may be untenable in a deployment of Smart LED Lights with integrated 3GPP 4G/5G Radios. Fronthaul interfaces can be at different levels in the 3GPP Radio stack, starting at C1 which is IQ data, or C2 consisting of OFDM symbols, up to C5 which is at the Ethernet packet level. Lower fronthaul numeration, for example the C1 interface, trades off fronthaul bandwidth for Radio complexity. A Radio with a C1 interface requires approximately 1 Gbps of fronthaul data to maintain an over-the-air throughput of 250 Mbps for a 4:1 ratio, while a Radio with a C5 interface approaches a 1:1 ratio, under the assumption of large file transmissions.

From a complexity standpoint, the C1 interface Radio is relatively simple and cost effective, demanding only a digital mixer, filters, and radio front end including an LNA and Power Amplifier. The C2 interface Radio adds FFT/IFFT blocks, frame synchronization, logic, and memory buffers representing a significant increment in cost and complexity. The C5 interface Radio introduces the necessity of a multi-core specialized digital signal processing architecture and is both complex and costly.

In some embodiments of an integrated Smart LED Light and 3GPP radio, a C1 interface is employed to minimize the cost and complexity of the Integrated unit. This goal minimizes software development by aligning the Integrated 4G/5G radio interfaces and operation with the core network software releases.

These issues may be resolved by redefining the 4G and 5G concepts of Advanced Antenna Systems (AAS) and mmW radios operating as a single Transmit Receive Point (TRP), for example a single radio base station, into a spatially distributed TRP provided as an array of 3GPP 4G/5G Radios. This logical definition enables a significant physical alignment of C1 packetized radio traffic by limiting DL and UL C1/C2/Cx data flows to specific zones of the coverage area. Additionally, embodiments of the invention may employ 3GPP features of Cell Grouping and Cell Combining.

Moreover, embodiments of the invention may meet 5G/NR latency requirements by applying 3GPP 4G5G NR UL/DL beamforming indexes and scheduling operation into the cartesian spatial coverage area of Smart LED Lighting zones. This solution maps spatial MU-MIMO onto Smart LED Lighting zones, enabling concurrent UL/DL transmissions in separate streams, minimizing latency.

Some embodiments may provide a 50-100× reduction in UL traffic (per radio unit) by means of a unique application of 3GPP 4G/5G beam based tracking and scheduling. To understand this mapping, some background information is necessary. 5G employs two different beam tracking management solutions depending on 3GPP 5G NR frequency:

FR1 or 'Frequency Range 1' is from 450 to 6000 MHz and radios referred to as 'sub-6 GHz.' Products operating in this frequency range typically use digital beam forming, and FR2 or 'Frequency Range 2' is from 24250 to 52600 MHz, and radio are referred to as 'mmW.' Products operating in this frequency range typically use analogue beamforming.

FR2 beam management normally assumes analogue beamforming, in which the receiver can only listen in a limited number of directions, and the transmitter can only transmit in a limited number of directions at any single point in time. Typically, these directions are configured at 1 ms or 0.5 ms time periods.

Figure 7:
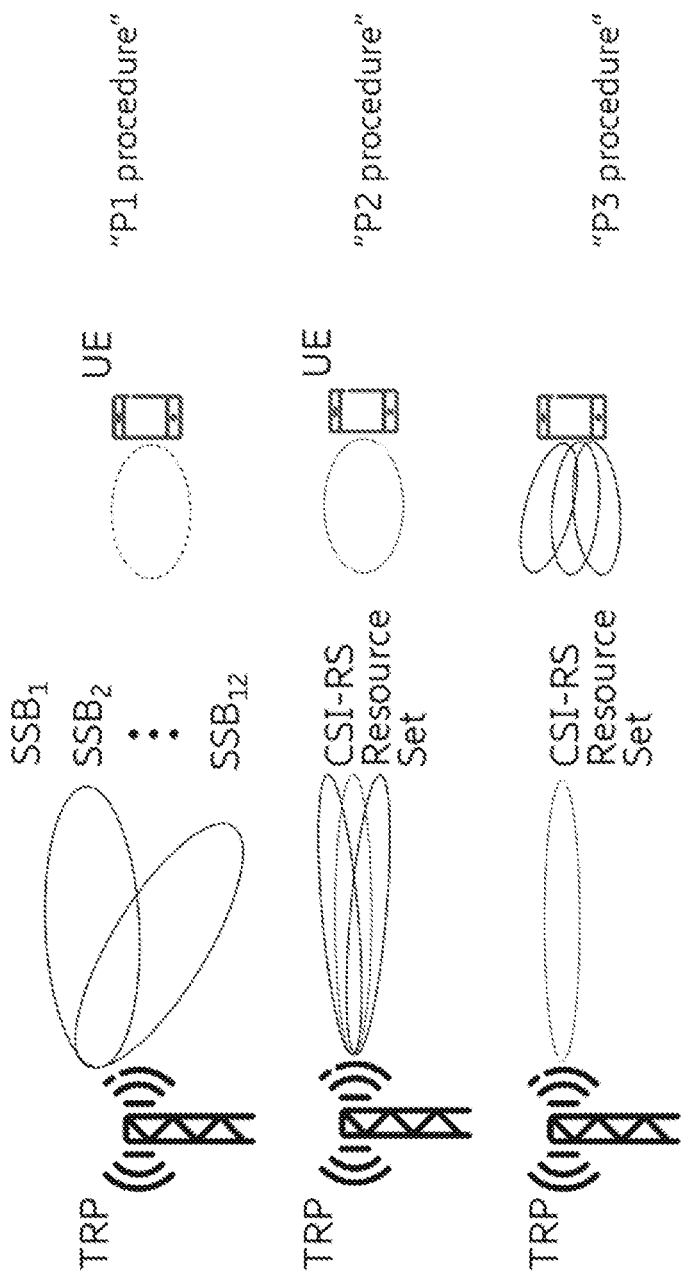
FIG. 7 schematically illustrates UE connection procedures.

FR2 beam management is a fast procedure which uses L1/L2 TRP SSB signaling to reduce latency. Initial beam establishment requires the TRP to transmit Synchronization Signaling Blocks (SSB) in "wide" beams, using beam sweeping. The UE finds a suitable TRP SSB beam with an acceptable threshold and responds by transmitting PRACH preamble in a PRACH resource associated with the SSB. The PRACH transmission time is indicated in system information. Concurrently, the TRP sweeps its RX beam to receive PRACH transmissions. This process of SSB wide beam establishment is called the "P1 Procedure", and is illustrated in FIG. 7.

This invention disclosure abstracts SSB "beams" to be spatial zones consisting of distributed TRPs, each of which is provided by a 3GPP 4G/5G Radio or a cluster of 2 or more 3GPP 4G/5G Radios.

Figure 8:
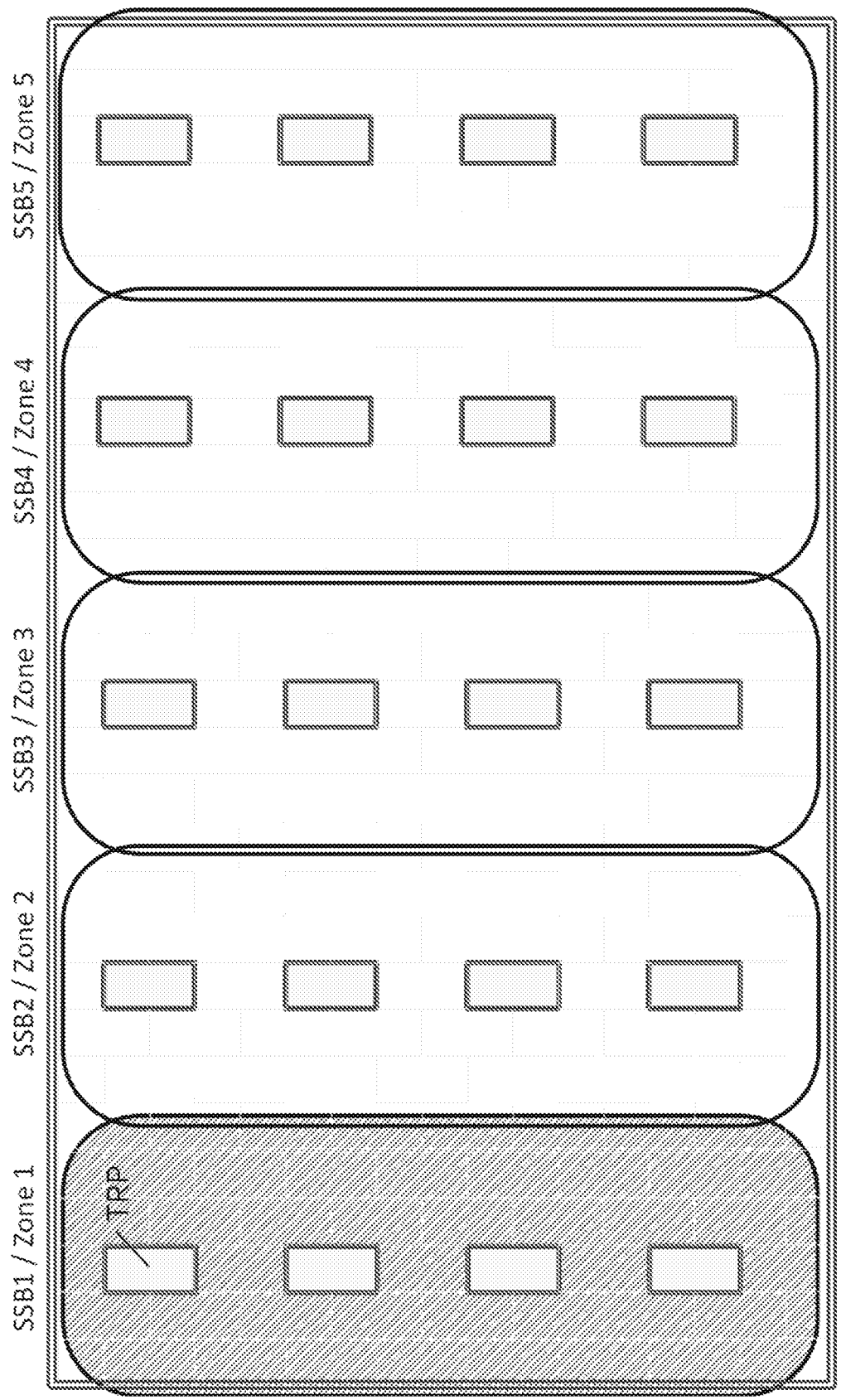
FIG. 8 illustrates partitioning of the example office space of FIG. 5 in accordance with an example embodiment of the present invention.

Using the ceiling layout of Smart LED light fixtures illustrated in FIG. 5, the SSB wide beams translate into the five zones illustrated in FIG. 8, which are referred to as "SSB1/Zone 1" (shown shaded in FIG. 8) to "SSB5/Zone 5." The linear grouping and number of integrated LED light/3GPP radio fixtures shown in FIG. 8 is representative and is intended to show the mapping of multiple adjacent integrated LED light/3GPP radio fixtures into an SSB coverage area. It is also important to note the differentiation from 3GPP which assigns multiple SSBs to a single TRP. In the example of FIG. 8, each integrated LED light/3GPP radio fixture represents a spatially distributed TRP. In doing so, the group of TRPs within a given Zone act together as a distributed antenna, with simulcasting properties.

Referring back to FIG. 7, FR2 beam management continues with the P2 procedure. After initial SSB wide beams have been established, the TRP performs Tx beam adjustment using the Channel State Information Reference Signal (CSI-RS), which is used by the User Equipment (UE) to estimate the channel and report channel quality information (CQI) to the base station.

Figure 9:
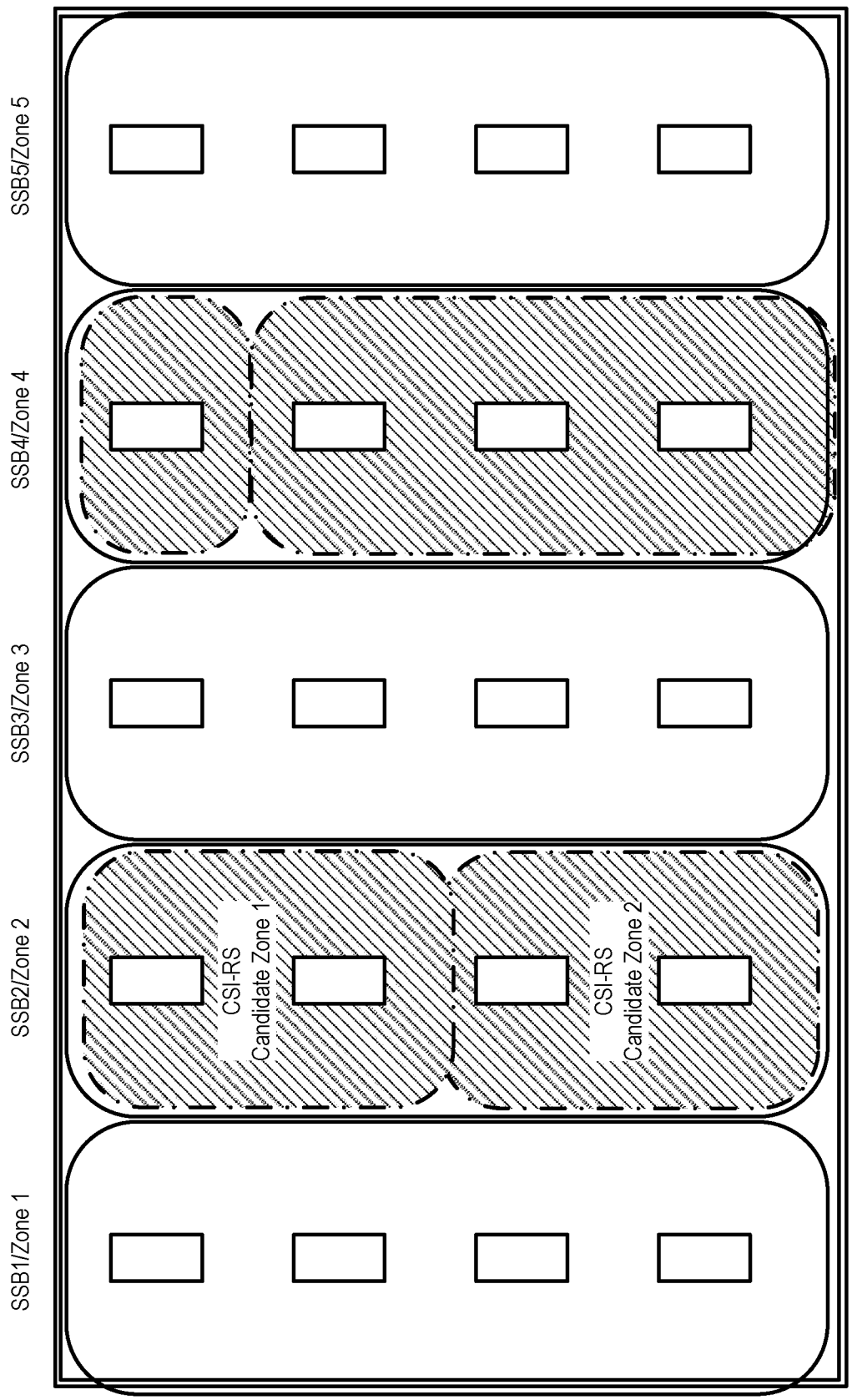
FIG. 9 illustrates sub-partitioning of the zones of FIG. 8 in accordance with an example embodiment of the present invention.

A TRP transmits CSI-RS in (different) candidate zones in a CSI-RS resource set. FIG. 9 illustrates an example in which SSB2 is sub-divided into two candidate CSI-RS zones each with two TRP elements, while SSB4 is sub-divided into two candidate CSI-RS zones with one TRP element and three TRP elements respectively.

Figure 10:
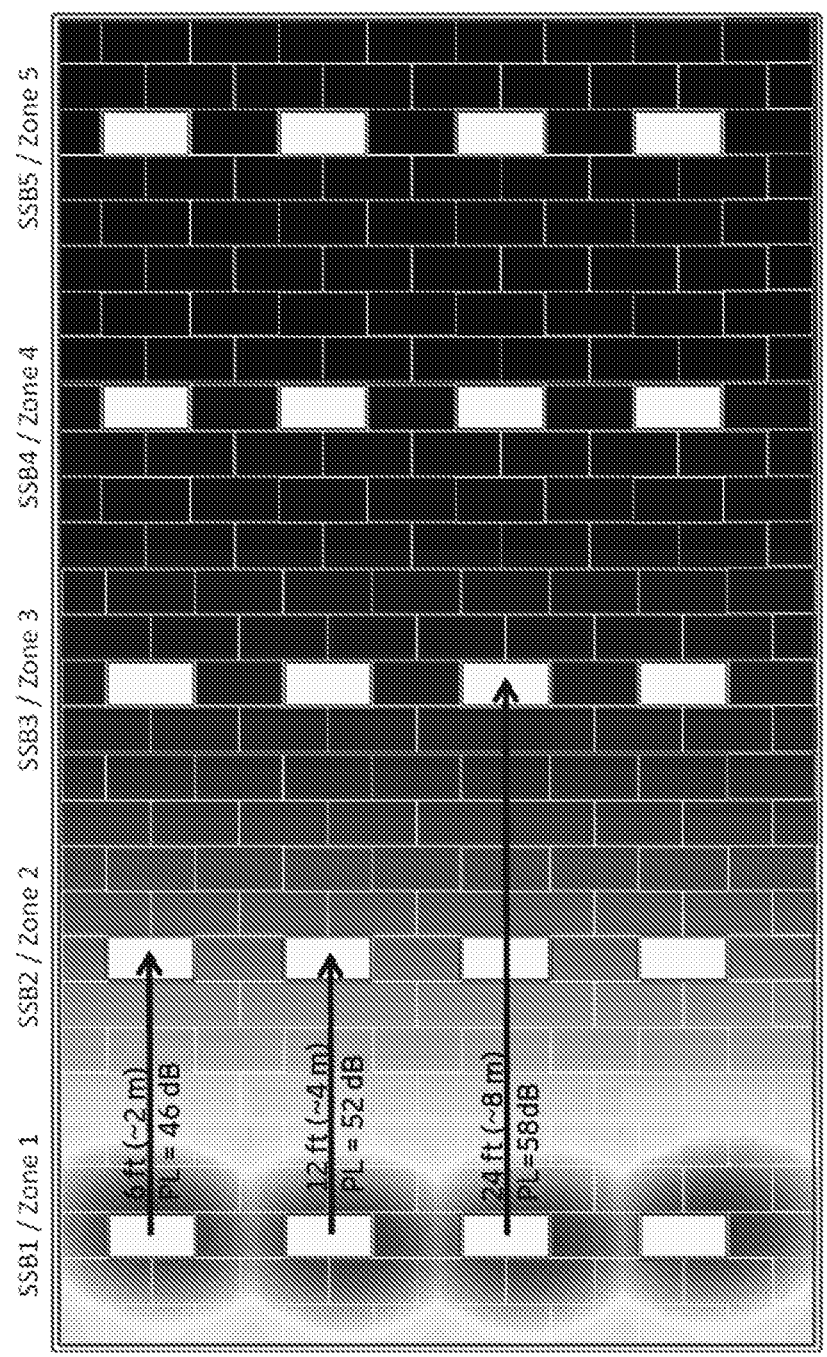
FIG. 10 illustrates a representative Signal to Noise and Interference Ratio (SNIR) as a function of distance in the partitioned office space of FIG. 8 for a case in which radio units in one zone are simultaneously transmitting.

While the specific method by which an Indoor deployment into cells, SSBs, and Candidate CSI-RS zones is not essential, the spatial separation of the SSBs and Candidate CSI-RS zones is important. This is highlighted in the examples of signal strength coverage of SSB wide areas shown in FIGS. 10 and 11. The example of FIG. 10 shows the relative signal strength of SSB1/Zone 1 relative to the other SSB Zones. This disclosure uses Friis formula to show that pathloss is proportional to d2. At the SSB1/SSB2 beam edge, d=2 m and pathloss=46 dB. At 4 m and 8 m, pathloss increases to 52 dB at SSB2 and 58 dB at SSB3. The low transmit power, and resulting small coverage areas, enables SSB zones to operate relatively independently.

Figure 11:
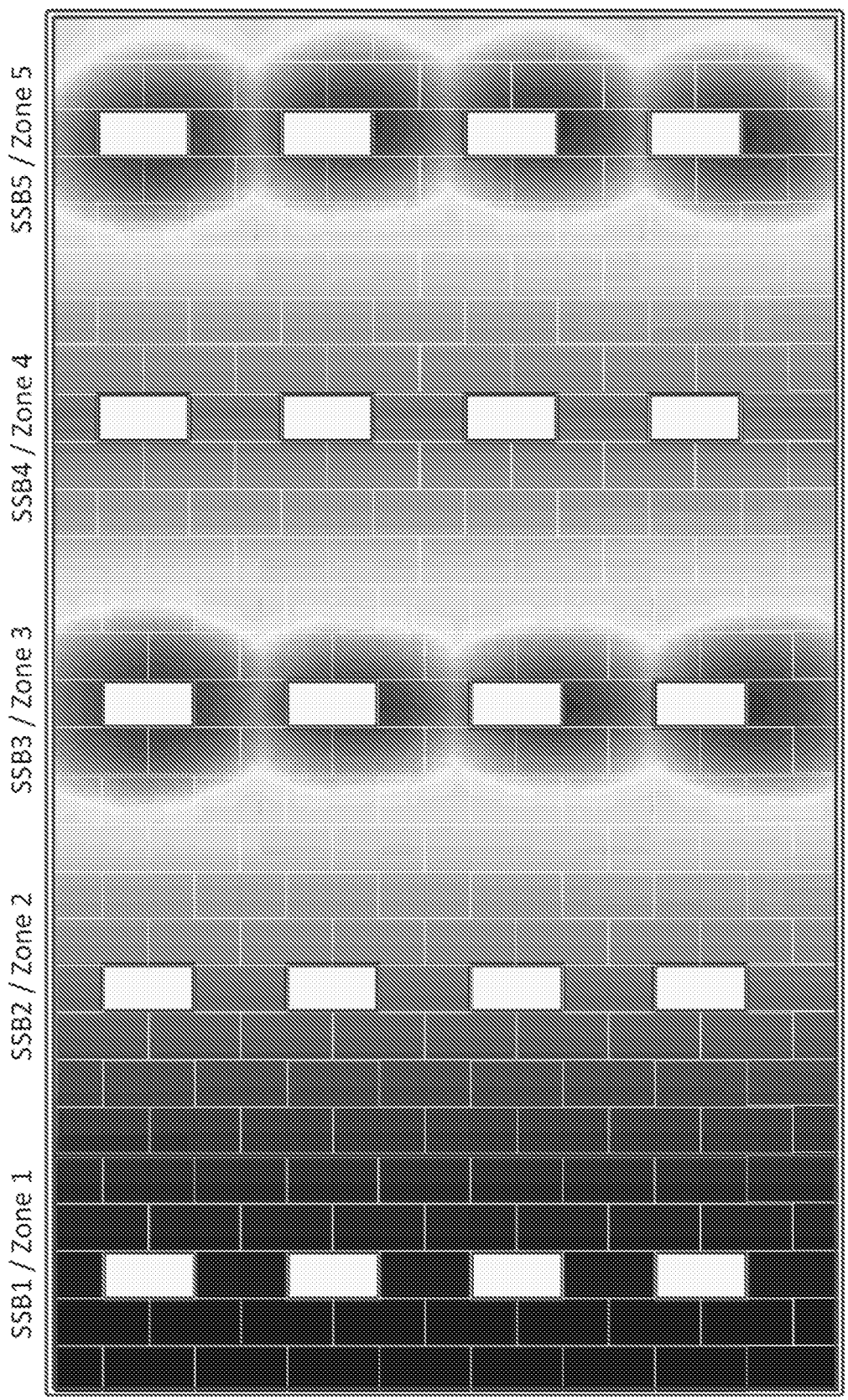
FIG. 11 illustrates a representative SNIR as a function of distance in the partitioned office space of FIG. 8 for a case in which radio units in two zones are simultaneously transmitting.

As may be seen in the example of FIG. 11, nearby spatial zones, such as SSB3/Zone 3 and SSB5/Zone 5 below have at least 10 dB of SINR. Indoor 4G/5G networks are typically designed with 8-12 dB of SINR from external macro networks to ensure higher performance operation.

Figure 12:
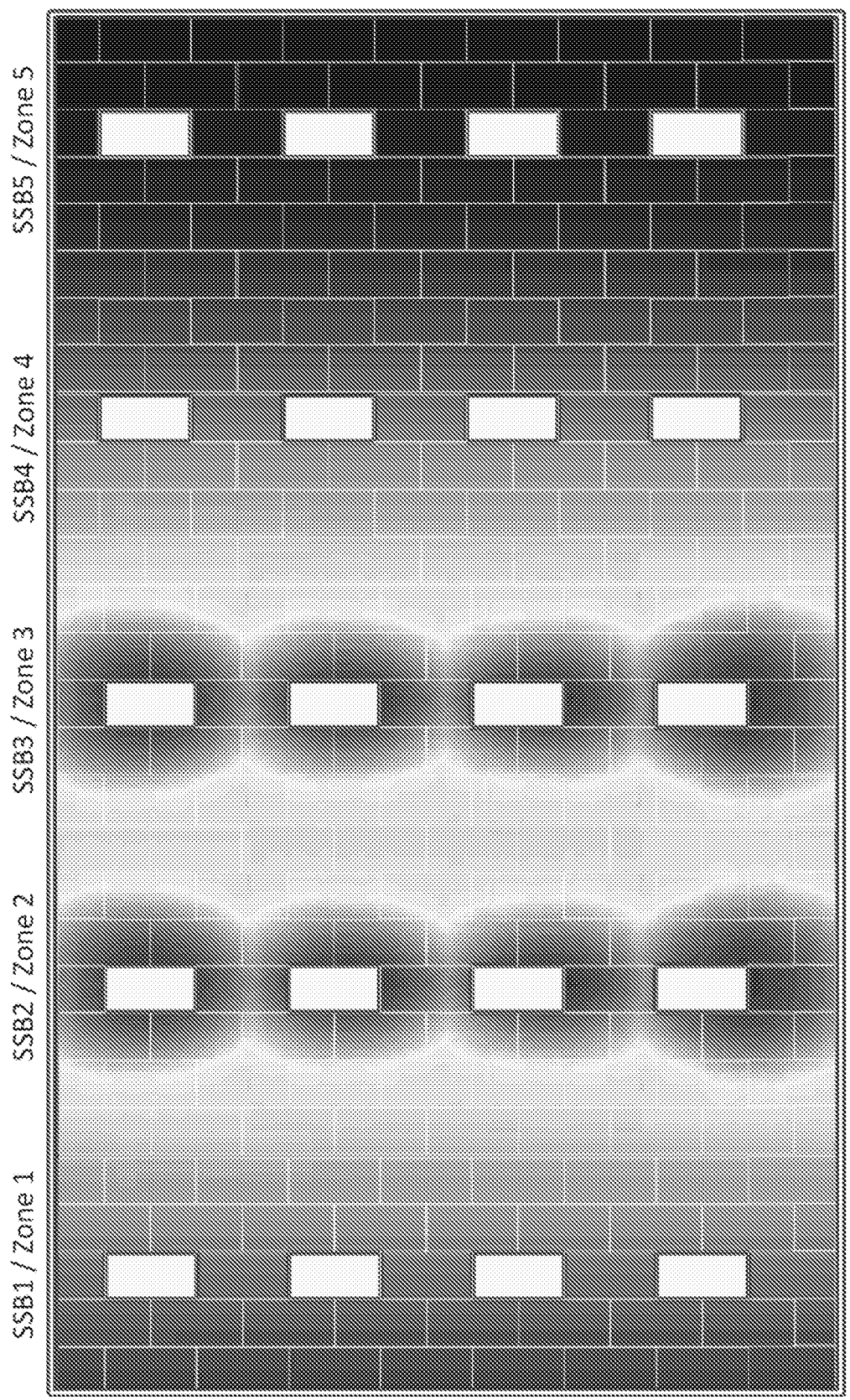
FIG. 12 illustrates another representative SNIR as a function of distance in the partitioned office space of FIG. 8 for a case in which radio units in two zones are simultaneously transmitting.

It is worth stating that overlapping SSB/Zones, whether configured as adjacent contiguous groups of TRPs as shown in FIG. 12 or as fully overlapping (i.e. a checkerboard TRP layout—not shown), may be used for Distributed MIMO operation.

Figure 13:
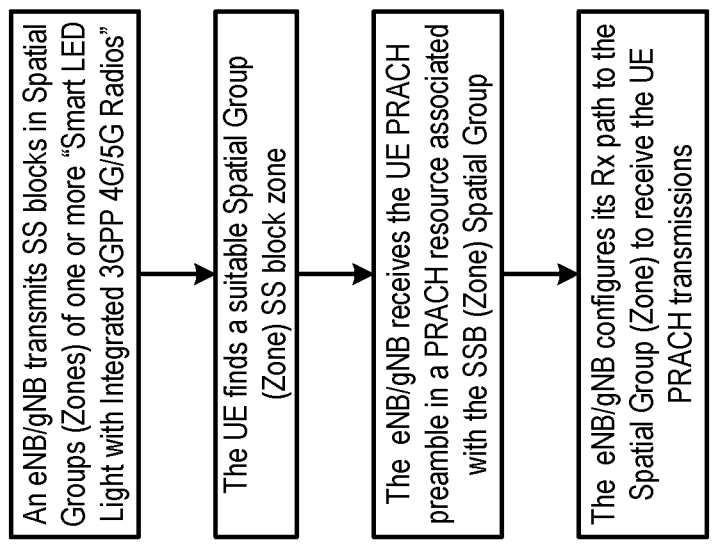
FIG. 13 is a flow chart illustrating a process for attachment of a UE to an SSB/zone in accordance with a representative embodiment of the present invention.
Figure 14:
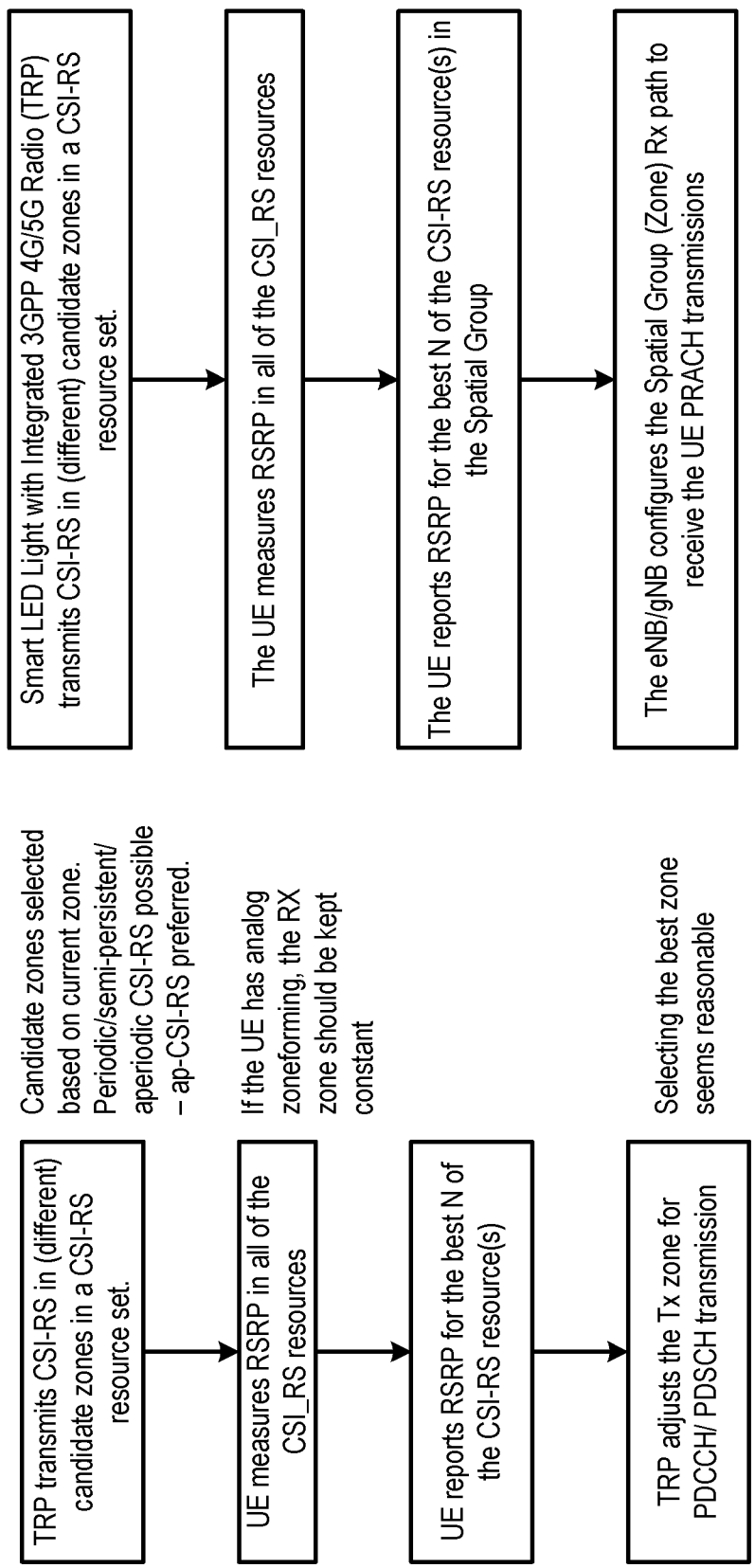
FIG. 14 is a flow chart illustrating a process for attachment of a UE to a CSI-RS/zone in accordance with a representative embodiment of the present invention.

Example FR2 beam management processes applied spatially to an integrated Smart LED Light/3GPP 4G/5G Radio fixture 300 is shown in FIGS. 13 and 14. FIG. 13 describes the process to attach a UE to an SSB Zone. FIG. 14 describes the process to attach a UE to a Candidate Beam (i.e. a cluster of integrated Smart LED Light/Radio fixtures or TRPs).

Figure 15:
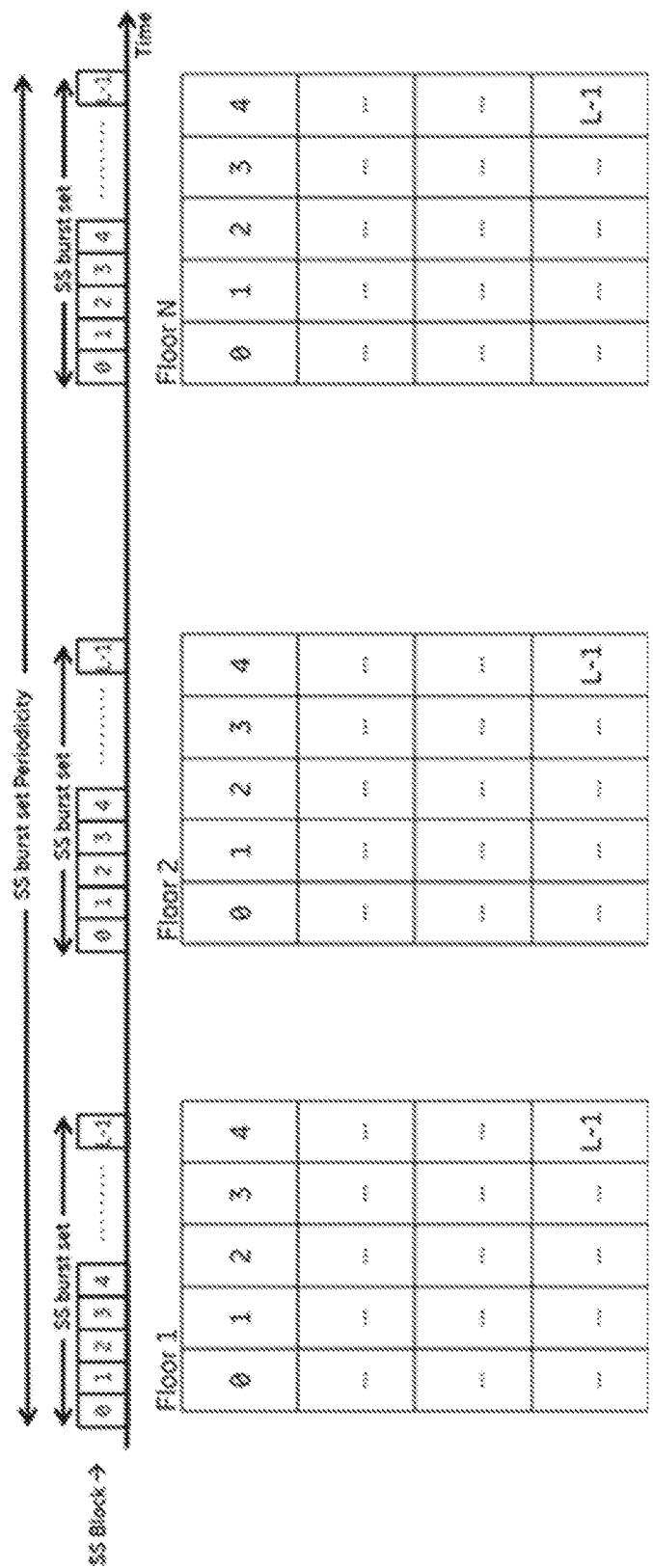
FIG. 15 is a block diagram illustrating SS bursts useable in embodiments of the present invention.

FIG. 15 depicts the mapping of synchronization signaling block (SSB) mapping onto zones or spatial coverage areas of a venue. During the P1/P2 process, SSBs are used to scan for UE's and sweeping—that is—scanning of sequential coverage area zones is performed across the venue serviced by a single cell or PCI. FIG. 15 shows a venue consisting of many floors, with each floor being divided into multiple zones or spatial coverage areas. Each zone or spatial coverage area consists of one or more Smart LED Lights with Integrated 3GPP 4G/5G Radio(s).

SS burst sets shown in FIG. 15 are assigned to different floors of a building. The scanning process repeats with a SS burst set periodicity, enabling a complete sweep of the entire cell coverage venue. Note that the assignment of SS burst sets to floor numbers is arbitrary, and intended only as an example to show the degree of scalability of the solution.

The P1/P2 process, with SS burst set periodicity, enables all UEs in the venue to be assigned to zones of one or more Smart LED lights with Integrated 3GPP 4G/5G Radios, so that all subsequent UE uplink and downlink data transfers can be scheduled and managed in zones. In doing so, the capacity of the switched Ethernet network connecting the Indoor Radio Units to the Smart LED Lights with Integrated 4G/5G Radios can be limited to only active zones. Downlink broadcasting is possible with IRU to Radio Ethernet simulcasting, limiting data to a single flow. SS burst set transmissions require unique IRU to Radio Ethernet transmissions only to specific spatial zones, which may represent one or more Smart LED Light with Integrated 4G/5G Radio(s), but typically not more than 8 or 16. Uplink data is scheduled by the eNB/gNB and is limited to specific spatial zones, thereby limited uplink Ethernet traffic to engineered levels allowed by the switched Ethernet network.

In combination, the P1/P2 process mapping UEs to unique TRP spatial coverage zones, and subsequent scheduling of uplink and downlink transmissions, and limits IRU to Radio switched Ethernet traffic, enabling a viable network architecture of low power Smart LED Lights with Integrated 3GPP 4G/5G Radios. This solution manages Ethernet traffic, and limits uplink noise figure by reducing the number of summed receivers to those contained within a zone. This solution enables multicarrier, multiband operation, as bandwidth is significant reduced enabling a plurality of carriers and services to be deployed.

Based on the foregoing, it may be appreciated that embodiments of the present invention may have any one or more of the following features:

An integrated Smart LED Light/3GPP radio fixture,
    the Smart LED Light may be connected to a network through a Power over Ethernet interface,
    the Smart LED Light may provide power and data connectivity to the Integrated 3GPP Radio,
    the Integrated 3GPP Radio may send an UL received radio data,
    the Integrated 3GPP Radio may receive DL control signals, and
    the Integrated 3GPP Radio may be dynamically configured to transmit UL radio data based on control information in the DL control signals.

A communication system including a base station connected to a plurality of integrated Smart LED Light/3GPP radio fixtures, each integrated Smart LED Light/3GPP radio fixture may be configured to operate as a transmit receive point (TRP) of the base station;
    a cluster of two or more of the integrated Smart LED Light/3GPP radio fixtures may be configured to cooperate as a distributed transmit receive point (TRP) of the base station;
    downlink data destined for a UE may be simulcast to all of the integrated Smart LED Light/3GPP radio fixtures within a selected cluster.
    Uplink data received from a UE by the integrated Smart LED Light/3GPP radio fixtures within a selected cluster may be forwarded to the base station from all of the integrated Smart LED Light/3GPP radio fixtures;

a cluster of two or more of the integrated Smart LED Light/3GPP radio fixtures may be configured to cooperate to provide connectivity for a user equipment (UE) within a predetermined zone of a coverage area of the communication system;

a first zone may be used to enable a UE to detect Synchronization Signaling Blocks (SSB), and a second zone may be used to enable a UE to detect Chanel State Information Reference Signal (CSI-RS);

the first zone may encompass a plurality of integrated Smart LED Light/3GPP radio fixtures and the second zone may encompass a subset of the integrated Smart LED Light/3GPP radio fixtures of the first zone.

While processes in the figures may show a particular order of operations performed by certain embodiments of the present disclosure, it should be understood that such order is representative, and that alternative embodiments may perform the operations in a different order, combine certain operations, overlap certain operations, etc.

Those skilled in the art will recognize improvements and modifications to the embodiments of the present disclosure. All such improvements and modifications are considered within the scope of the concepts disclosed herein.

Those skilled in the art will also recognize the Smart LED light and Integrated 3GPP radio unit transmit electromagnetic signals and have coverage areas which overlap but differ in size according to their unique definition of coverage, where light coverage is defined by required luminosity and radio coverage is defined by required downlink and uplink RF power in units of dBm (decibels relative to 1 mW). Those skilled in the art know that a 3GPP radio unit TRP which is configured to send and receive radio signals within a coverage area that corresponds with an illumination coverage area, is therefore an engineering approximation and is affected by environmental factors as much as network design practices.

This disclosure discloses of a new sub-class of radio base station, which is unique from the classifications found in 3GPP ETSI TR 125 951. Wide Area BS (macro); Medium Range BS (micro); and Local Area BS (Pico/Femto). These classes are well described in this 3GPP specification:

Different sets of requirements are derived from calculations based on Minimum Coupling Loss between BS and UE. Each set of requirements corresponds to a base station class is used as criteria for classification. Three classes are defined: Wide Area BS class, Medium Range BS class and Local Area BS class.

Wide Area BS class assumes relatively high MCL, as is typically found in outdoor macro environments, where the BS antennas are located in masts, roof tops or high above street level. Existing requirements are used, as they are in [1], for the base station intended for general-purpose applications.

Medium Range BS class assumes medium MCL, as typically found in outdoor micro environments, where the BS antennas are located below roof tops.

Local Area BS class assumes relatively low MCL, as is typically found indoors (offices, subway stations etc) where antennas are located on the ceilings or walls or possibly built-in in the BS on the wall. Low-CL can also be found outdoors on hot spot areas like market place, high street or railway station. New requirements, as defined in this TR, are set for the Local Area BS class.

These classifications have required power levels, with the Local Areas (Pico) BS having a minimum output power of +24 dBm, described in section 5.5.1.2. This invention teaches of new sub-class of Local Area (Distributed) BS which has a minimum output power of +10 dBm and employs multicasting of signals over indoor venues, with spatial UE up link scheduling.

What is claimed is:

1. An integrated Smart LED Light/3GPP radio fixture, comprising:
    a Smart LED light fixture comprising a first control processor controlling the Smart LED light fixture, the Smart LED light fixture being disposed in an LED light compartment; and
    a 3GPP radio unit comprising:
        a second control processor controlling the 3GPP radio unit,
        a radio front end coupled to the second control processor, and
        one or more antennas coupled to the radio front end,
    wherein the 3GPP radio unit is disposed in a radio compartment separate from the LED light compartment,
    wherein the first control processor is coupled to the second control processor by a control link between the LED light compartment and the radio compartment,
    wherein the one or more antennas are configured to transmit and receive radio signals within a coverage area that corresponds with an illumination coverage area of the Smart LED light fixture, and
    wherein the second control processor is configured to receive a control signal, and adjust a power consumption of the one or more antennas via the radio front end in response to the received control signal.

2. The integrated Smart LED Light/3GPP radio fixture of claim 1, wherein the control signal is received from either one or both of the Smart LED Light Fixture and a Smart LED Light Fixture Network Controller.

3. The integrated Smart LED Light/3GPP radio fixture of claim 1, wherein the control signal comprises any one or more of:
    a proximity sensor indication;
    a Smart LED light fixture model indication;
    an illumination intensity of the Smart LED light fixture; and
    an illumination pattern of the Smart LED light fixture.

4. A communications system comprising:
    a base station; and
    a plurality of integrated Smart LED Light/3GPP radio fixtures connected to the base station via a Power over Ethernet, PoE, capable network, each integrated Smart LED Light/3GPP radio fixture including:
        a Smart LED light fixture comprising a first control processor controlling the Smart LED light fixture, the Smart LED light fixture being disposed in an LED light compartment; and
        a 3GPP radio unit comprising:
            a second control processor controlling the 3GPP radio unit,
            a radio front end coupled to the second control processor, and
            one or more antennas coupled to the radio front end,
        wherein the 3GPP radio unit is disposed in a radio compartment separate from the LED light compartment, wherein the first control processor is coupled to the second control processor by a control link between the LED light compartment and the radio compartment, wherein the one or more antennas are configured to transmit and receive radio signals within a coverage area that corresponds with an illumination coverage area of the Smart LED light fixture, and wherein the second control processor is configured to receive a control signal, and adjust a power consumption of the one or more antennas via the radio front end in response to the received control signal.

5. The communications system of claim 4, wherein each integrated Smart LED Light/3GPP radio fixture is configured to operate as a transmit receive point, TRP, of the base station.

6. The communications system of claim 4, wherein a cluster of two or more of the integrated Smart LED Light/3GPP radio fixtures are configured to cooperate to provide connectivity for a user equipment, UE, within a predetermined zone of a coverage area of the communication system.

7. The communications system of claim 6, wherein the two or more integrated Smart LED Light/3GPP radio fixtures in the cluster are configured to cooperate as a distributed transmit receive point, TRP, of the base station.

8. The communications system of claim 7, wherein the distributed transmit receive point, TRP is allocated a unique Channel State Indicator-Reference Signal, CSI-RS.

9. The communications system of claim 7, wherein each integrated Smart LED Light/3GPP radio fixture in the cluster is configured to simulcast downlink transmissions and aggregate uplink carriers.

10. The communications system of claim 6, wherein two or more clusters are configured to cooperate to define a Synchronization Signal Block, SSB, coverage zone of the communications system.

11. The communications system of claim 10, wherein each integrated Smart LED Light/3GPP radio fixture in the SSB coverage zone is configured to use L1/L2 TRP SSB signaling.

12. The communications system of claim 4, further comprising at least one Indoor Radio Unit (IRU) connected to the base station and the a plurality of integrated Smart LED Light/3GPP radio fixtures, the at least one IRU configured to simulcast downlink signal transmissions to the plurality of integrated Smart LED Light/3GPP radio fixtures, and sum uplink signals received from the plurality of integrated Smart LED Light/3GPP radio fixtures.

13. The communications system of claim 12, wherein simulcast downlink signal transmissions have the same Physical Cell Identity, PCI.

14. The communications system of claim 12, wherein each IRU is configured to send a control signal to the plurality of integrated Smart LED Light/3GPP radio fixtures, the control signal configured to control signal gating of the transmission of received signals from the plurality of integrated Smart LED Light/3GPP radio fixtures.

15. The integrated Smart LED Light/3GPP radio fixture of claim 1, wherein the 3GPP radio unit has a transmit power of less than +10 dBm.

16. The integrated Smart LED Light/3GPP radio fixture of claim 3, wherein the control signal comprises a proximity sensor indication.

17. The integrated Smart LED Light/3GPP radio fixture of claim 3, wherein the control signal comprises a Smart LED light fixture model indication.

18. The integrated Smart LED Light/3GPP radio fixture of claim 3, wherein the control signal comprises an illumination intensity of the Smart LED light fixture.

19. The integrated Smart LED Light/3GPP radio fixture of claim 4, wherein the control signal comprises an illumination pattern of the Smart LED light fixture.

20. The integrated Smart LED Light/3GPP radio fixture of claim 1, further comprising thermal ventilation holes in a frame of the integrated Smart LED Light/3GPP radio fixture enabling air flow through the integrated Smart LED Light/3GPP radio fixture.

* * * * *